United States Patent
Swiecicki

[15] 3,704,856
[45] Dec. 5, 1972

[54] VALVE WITH ENERGY DISSIPATION CHAMBER

[72] Inventor: Tgnacy Swiecicki, York, Pa.

[73] Assignee: Allis-Chalmers Manufacturing Company, Milwaukee, Wis.

[22] Filed: Nov. 5, 1970

[21] Appl. No.: 87,245

[52] U.S. Cl. ............................ 251/118, 137/219
[51] Int. Cl. ................................. F16k 47/00
[58] Field of Search ................. 137/219; 251/118

[56] References Cited

UNITED STATES PATENTS

| 2,685,426 | 8/1954 | MacGregor | 251/118 |
| 2,915,277 | 12/1959 | Diefenderfer | 251/118 |
| 2,950,732 | 8/1960 | Lambert | 137/219 |
| 1,387,446 | 8/1921 | Astier | 137/219 |
| 2,976,880 | 3/1961 | Cassarino | 137/219 |
| 2,878,827 | 3/1959 | Johnson et al. | 137/219 |

Primary Examiner—Henry T. Klinksiek
Attorney—John P. Hines, Robert B. Benson and Charles L. Schwab

[57] ABSTRACT

A valve for handling large volumes of water including an energy dissipating chamber. A valve is provided at the inlet to the chamber which includes a water deflecting surface causing the onrushing water to be deflected against the side walls of the energy dissipating chamber when the valve is open. A sleeve slidably contained on the deflecting member engages the end wall of the dissipating chamber when it is desired to block the flow of water. To open the valve the sleeve is moved downstream from the end wall presenting an unobstructed circular orifice forcing the water into a fan shape as it enters the energy dissipating chamber.

1 Claim, 3 Drawing Figures

PATENTED DEC 5 1972 3,704,856

Inventor
Ignacy Święcicki
by John B Hines
Attorneys

VALVE WITH ENERGY DISSIPATION CHAMBER

This invention pertains in general to valves and more particularly to the combination of a valve and an energy dissipating chamber for handling large volumes of water.

The valve of this invention is particularly applicable to the control of large volumes of water. It is intended that it will be used in connection with hydraulic turbine installations, for flood control, irrigation and drainage requirements. One particular valve which has found wide use in controlling large volumes of water is the HOWELL-BUNGER valve which is described in U.S. Pat. No. 1,894,314 issued to D. H. Howell et al., Jan. 17, 1933. In the HOWELL-BUNGER valve the issuing jet from the valve is in the form of a spray. In most applications this discharge spray is desirable; however, in certain instances it is necessary to provide a confined discharge from the valve.

When handling large volumes of water, it is necessary to dissipate the considerable energy in the water. This has been accomplished in the past by discharging the water in the form of a fan-shaped spray which dissipates the water energy.

The applicant's invention is directed to a valve providing a confined discharge wherein the energy of the water is dissipated in a chamber upstream from the discharge port. The water entering the energy dissipating chamber is forced into a fan shape by means of a circular orifice concentric with the chamber inlet port. The orifice is formed between the end wall of the energy dissipating chamber and a movable cylindrical sleeve concentric with the inlet port. The position of the cylindrical sleeve is adjustable, allowing variation of the orifice width regulating the volume of water entering the energy dissipating chamber. At all valve openings the water incoming through the orifice to the energy dissipating chamber is directed against the end wall of the chamber about the inlet port. Because of directing the water against the end wall the pressure at the end wall is maintained at a high level. Therefore, cavitation and the inherent detrimental effects of low pressure areas along the end wall are eliminated or substantially reduced.

It is therefore the intention and the general object of this invention to provide a valve for controlling large volumes of water which includes an energy dissipating chamber and means to overcome low pressure pockets along the chamber wall.

A more specific object of the subject invention is to provide a valve of the hereinbefore described type wherein an adjustable circular orifice is provided within the energy dissipating chamber which causes the water to enter the chamber in a fan-shaped stream.

An additional object of this invention is to provide a valve of the hereinbefore described type wherein the orifice directs the water against the wall of the energy dissipating chamber avoiding low pressure pockets along this wall.

A further object of the subject invention is to provide a valve of the herein described type wherein a baffle is provided within the energy dissipating chamber which causes the water to enter the chamber in a fan-shaped stream when the valve is fully open.

Another object of the subject invention is to provide a valve of the hereinbefore described type wherein the terminal end of the discharge port from the energy dissipating chamber is located within the chamber.

These and other objects of the subject invention will become more fully apparent as the following description is read in light of the attached drawing in which.

Figure 1:
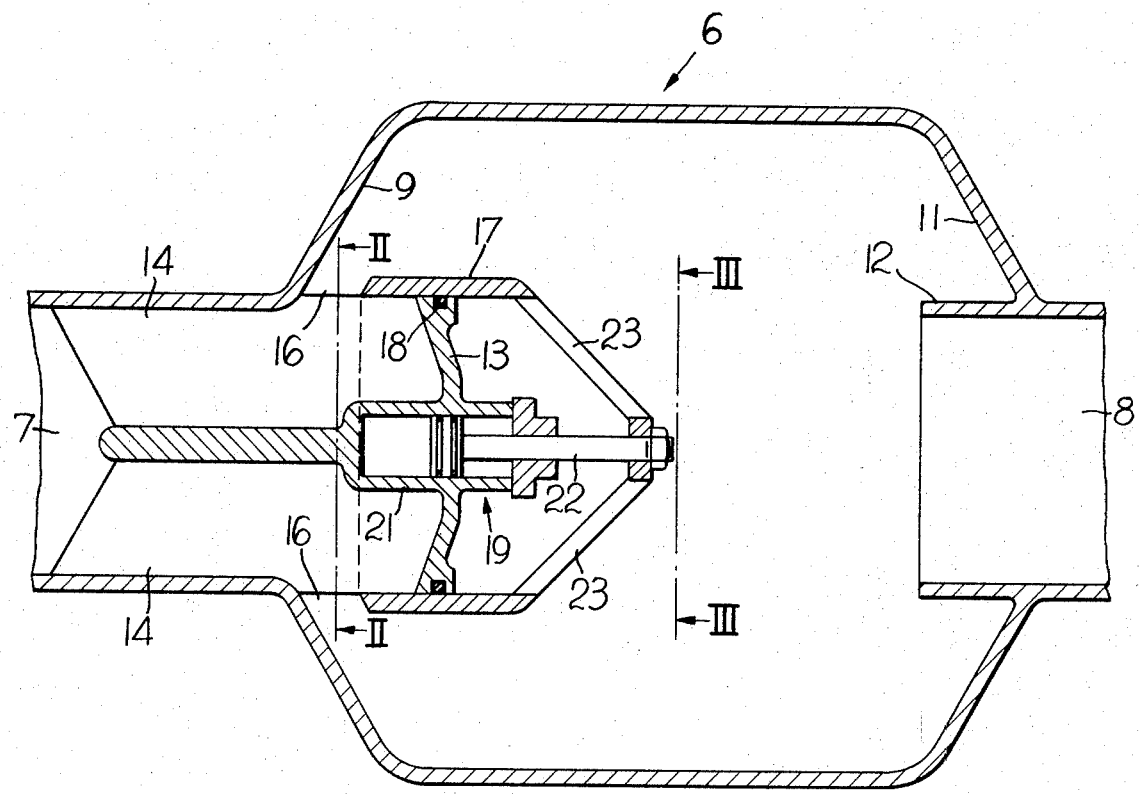
FIG. 1 shows a cross sectional view of a valve constructed in accordance with the invention.
Figure 2:
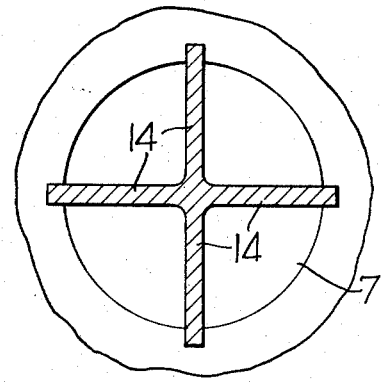
FIG. 2 is a cross sectional view taken on line II—II of FIG. 1.
Figure 3:
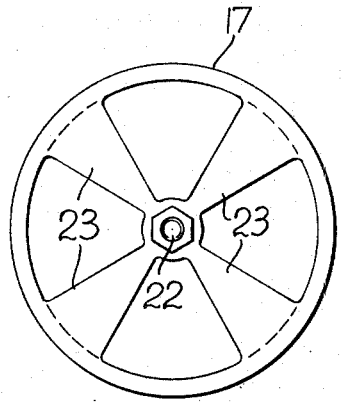
FIG. 3 is a view taken on line III—III of FIG. 1.

Referring to the attached drawing, an energy dissipating chamber 6 is shown having an inlet port 7 and a discharge port 8. Although, as shown herein for purposes of illustration, the inlet and discharge ports are aligned, it should be understood that the discharge port could be located in the side wall of the chamber 6. The end walls 9 and 11 of the chamber 6 about the inlet port and discharge port, respectively, diverge sharply outward at a substantial angle relative to the longitudinal axis of the valve. Furthermore, it should be noted that in the preferred embodiment of the invention, the discharge port terminal end 12 is located within the chamber 6. This assists further in the dissipation of the energy of the water within the chamber.

A stationary baffle generally designated 13 is located within the chamber 6 adjacent to and aligned with the inlet port 7. This baffle member 13 may be supported in any conventional manner and is herein shown connected to flat ribs 14 which are in turn connected to the interior surface of the inlet port 7. The baffle member 13 is disposed at an angle relative to the horizontal axis of the valve greater than the angle of the end wall 9. In this manner, when the valve is fully open the baffle member 13 directs the incoming water against the end wall 9 through the annular opening 16 defined by the baffle and end wall 9. This arrangement of the baffle and end wall causes the water to enter the chamber 6 in the form of a fan-shaped spray which dissipates the water energy. In the preferred embodiment as shown herein, the baffle member 13 is disposed at an angle greater than 90° relative to the horizontal axis of the valve so as to present a concave surface to the incoming water.

When water enters an enlarged chamber from a restricted passageway, a low pressure pocket may be formed about the restricted passageway at its connection to the chamber. The low pressure area can cause cavitation resulting in physical damage to the structure. With this arrangement, because of the angle of the deflecting member 13, the incoming water is directed into the area where otherwise a low pressure pocket may form, thereby overcoming or substantially lessening the possibility of cavitation occurring.

An annular closure member or sleeve 17 is slidably contained on the exterior surface of the baffle member 13. An O-ring 18 may be provided in a groove formed in the exterior peripheral surface of the baffle member 13 to provide a seal between the sleeve and the baffle member. Operating means 19 may be provided to move the sleeve 17 relative to the baffle member 13. To this end, a hub 21 is provided at the center of the baffle member 13. The hub in effect is a double-acting hydraulic cylinder having a piston rod 22 reciprocable therein. The piston rod is connected to a plurality of ribs 23 which are formed as part of the sleeve 17.

With the controlled discharge energy dissipating valve above described, large volumes of water can be handled without the associated water hammer and cavitation problems. Because of the location of the baffle member 13 relative to the inlet port and the end walls of the dissipating chamber 6, the energy of the incoming water is to a great extent dissipated in the chamber 6. The discharge of the low energy water is then confined through the discharge port 8.

The embodiments of the invention in which an exclusive property or privilege is claimed are defined as follows:

1. A liquid energy dissipating free discharge valve comprising: walls defining a liquid energy dissipating chamber having inlet and discharge ports, the cross sectional area of said chamber being substantially greater than the cross sectional area of either of said ports, said chamber having an end wall connected to said inlet port disposed at an acute angle with the horizontal axis of said valve; a cylindrical closure member located within said chamber adapted for reciprocating movement into and out of engagement with said end wall to interrupt and permit the flow of liquid into said chamber, said closure member when in an open position defining a circular orifice with said end wall wherein the incoming liquid is forced into a fan shape; and power operating means supported within said energy dissipating chamber adjacent the inlet port and operatively connected to said closure member for moving same between open and closed positions; and an annular baffle member connected to said power operating means and coaxially aligned with said inlet port, said closure member slidably supported on the peripheral surface of said baffle member.

* * * * *